M. W. MARSDEN.
OBTURATING MATERIAL AND METHOD OF MAKING SAME.
APPLICATION FILED JULY 8, 1913.

1,235,220.

Patented July 31, 1917.

WITNESSES:
Robt. R. Kitchel
Frank E. French

INVENTOR
Mark W. Marsden
BY
Augustus B. Stoughton
ATTORNEY

UNITED STATES PATENT OFFICE.

MARK W. MARSDEN, OF PHILADELPHIA, PENNSYLVANIA.

OBTURATING MATERIAL AND METHOD OF MAKING SAME.

1,235,220.  Specification of Letters Patent.  Patented July 31, 1917.

Application filed July 8, 1913. Serial No. 777,819.

*To all whom it may concern:*

Be it known that I, MARK W. MARSDEN, a citizen of the United States, residing at Philadelphia, in the county of Philadelphia and State of Pennsylvania, have invented certain new and useful Improvements in Obturating Materials and Methods of Making Same, of which the following is a specification.

Heretofore the pith of corn stalks separated from the fiber and other parts of the plant and comminuted has been used for packing the watertight compartments or coffer-dams of battle-ships and other vessels and for other purposes, but the result was not successful because the comminuted pith becomes infested by vermin and soured and fermented and invariably becomes unsanitary and useless. Furthermore the comminuted corn pith existed in very small particles which were not sufficiently bound or held together, so that the mass disintegrated and became fluffy and difficult or impossible to pack and apply. In addition to all of this the trouble and expense of separating the pith from the other parts of the stalk were prohibitory.

The principal object of the present invention is to provide an obturating material and a method of making it from corn stalks which will avoid the difficulties and defects above referred to, as well as other difficulties and defects which are well understood though perhaps not mentioned above.

Speaking generally the obturating material of this invention consists of a coherent, heterogeneous mixture of both the comminuted pithy and comminuted fibrous constituents of corn stalks previously and chemically deprived of fermentative ingredients and incrusting matter and in a state of compression and characterized by the property of suddenly swelling and expanding when wet and having a cork-like structure and texture.

The method of making the described obturating material consists in cutting or chopping the corn stalks previously freed from the ears, leaves and dust into pieces of appropriate length, removing fermentative saccharine and other soluble matter from them by treating them with steam and pressure, subjecting the pieces so treated to the action of a weak alkaline solution to dissolve the silicious and incrusting matter and washing them, pulping the washed pieces, molding and drying the material and compressing the molded material.

The invention will be claimed at the end hereof, but will be first described in connection with the apparatus selected from a variety of apparatus for illustration in the accompanying drawings, in which—

Figure 1:
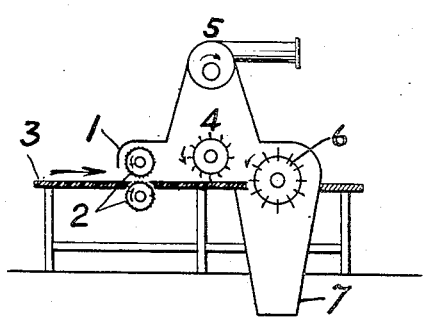
Figure 1, is a more or less diagrammatic view, partly in section.
Figure 3:
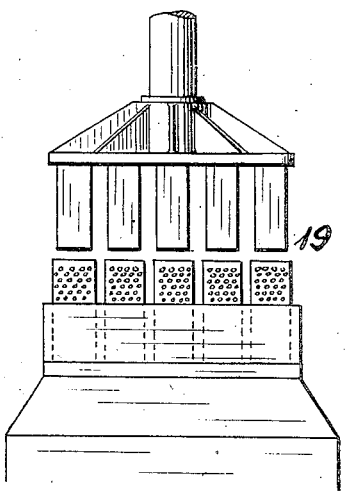
Fig. 3, is a view of a press.
Figure 2:
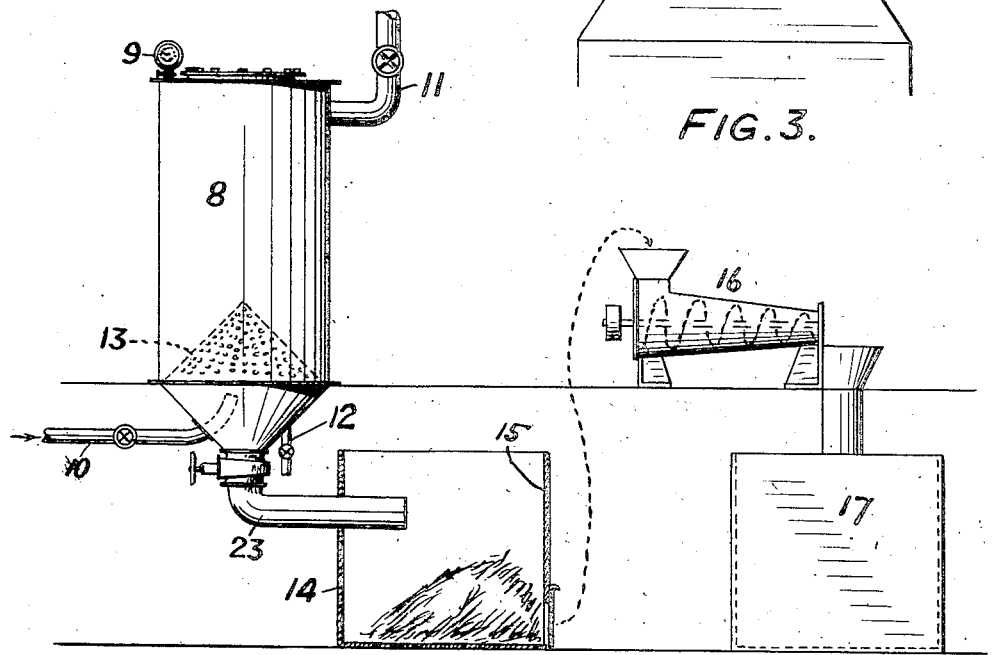
Fig. 2, is a perspective view of a mold drawn to an enlarged scale.
Figure 2:
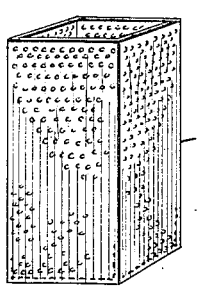

The corn stalks as they are harvested, but with the corn removed, are fed into the housing 1, between the feed rollers 2 and along the table 3. The projections on the rollers 4 strip the leaves from the stalks and the exhauster 5 takes off the leaves and dust, leaving the stalks. The knives on the wheel 6 cut the stalks into pieces of, for example, two to four inches in length. From the delivering chute 7 these pieces of corn stalk are fed in any appropriate way to one or more boilers or steam digesters 8. In the drawings one steam digester 8 is shown, but in practice more would be used. The pieces of corn stalk in the steam digester 8 are subjected to steam pressure of, for example, from twenty-five to fifty pounds for from one to two hours, with the result that saccharine and other soluble and fermentative matter is extracted and separated. The gage 9 indicates that the appropriate steam pressure exists within the steam digester 8. The steam is admitted at 10 and the digester may periodically be blown off or relieved of extreme pressure by means of the pipe 11. The saccharine and other soluble and fermentative matter is drawn off and separated from the pieces of corn stalks by means of the pipe 12. 13 indicates a foraminous bottom arranged in the steam digester 8. The pieces of corn stalks having been thus deprived of saccharine, soluble and other fermentative matter by the treatment above set forth are subjected to the action of a weak alkaline solution of sufficient strength to dissolve the silicious incrusting matter, whereupon it is washed and cleansed by repeated washings with water, thus removing the silicious and incrusting matter. Thereafter the material is removed from the digester 8 by way of the valved outlet 23 and is collected in a suitable bin 14. In blowing off the digester, the contents may be allowed to impinge upon the wall 15 of the bin 14 and in this way the structure of the material is broken down. The washed material is then beaten into a pulp of any desired fineness, having regard to the purposes for which the final product is to be used. For this purpose the washed material may be passed through the beater 16 and delivered into the tank 17. It is sometimes important, as where the material is to be used on steamships that it be made uniflammable. When it is desired to do this the material in the tank 17 is treated with a saturated solution of sal-ammoniac and alum of equal parts by adding the solution to the pulp in appropriate quantities for attaining the desired results. In practice the quantity varies but from five to ten pounds of the combined sal-ammoniac and alum to one hundred pounds of the dry pulp is an example. The material while in a liquid or floating state is run into perforated molds 18, of any desired size and the fire-proofing solution is drained back into the mixing tank 17. Thereupon the molds are placed in a heater to evaporate the remaining moisture and when dry the material is compressed as by the press 19 to the proper density; for example until it weighs from eight to twelve pounds per cubic foot. If the material is not fire-proofed it is put into the molds and dried and pressed. The shape of the molds, as well as their size is appropriate for making blocks, boards or slabs according to the uses to which the material is to be put, such as an interlining for refrigerating cars or chambers or for coffer-dams and the like.

The compressed blocks may be placed or packed in the coffer-dams in layers, varying the way of placing them so as to have the line of compression at different angles and thus, when wet, the material will expand in every direction so that the moment it is punctured by a projectile or other injury to the outside shell, which permits of the entry of water, the latter will cause expansion of the obturating material which will prevent the inflow of water. The described material may be repeatedly wet and expanded and dried and compressed and if desired it can be pressed when it is wet and dried in a state of compression.

It will be obvious to those skilled in the art to which my invention relates that modifications may be made in details without departing from the spirit thereof, hence I do not desire to limit my patent further than the prior state of the art may require, but

Having thus described my invention, what I claim as new is—

1. An obturating material comprising a dry, coherent decomposition resisting block having a cork-like texture and structure and characterized by the property of suddenly swelling and expanding when wet, and consisting of a heterogeneous mass, in a state of compression of both comminuted fibers and comminuted pith of corn stalks previously and chemically deprived of fermentative matter, substantially as described.

2. The method of making obturating material from corn stalks which consists in cutting up the stalks into pieces, digesting these pieces with steam and pressure to free them of saccharine and fermentative matter, separating the saccharine and fermentative matter from the digested mass, subjecting the digested mass freed from saccharine and fermentative matter to the action of alkali to free its incrusting matter, washing the mass after treatment with alkali to remove the incrusting matter, and finally compressing the mass, substantially as described.

In testimony whereof I have hereunto signed my name in the presence of two witnesses.

MARK W. MARSDEN.

Witnesses:
CLIFFORD K. CASSEL,
FRANK E. FRENCH.